C. O'NEILL & W. H. NEUBECK.
FLEXIBLE BALL JOINT.
APPLICATION FILED MAY 19, 1909.

959,378.

Patented May 24, 1910.
2 SHEETS—SHEET 1.

William H. Neubeck and Charles O'Neill, Inventors

By Victor J. Evans, Attorney

Witnesses

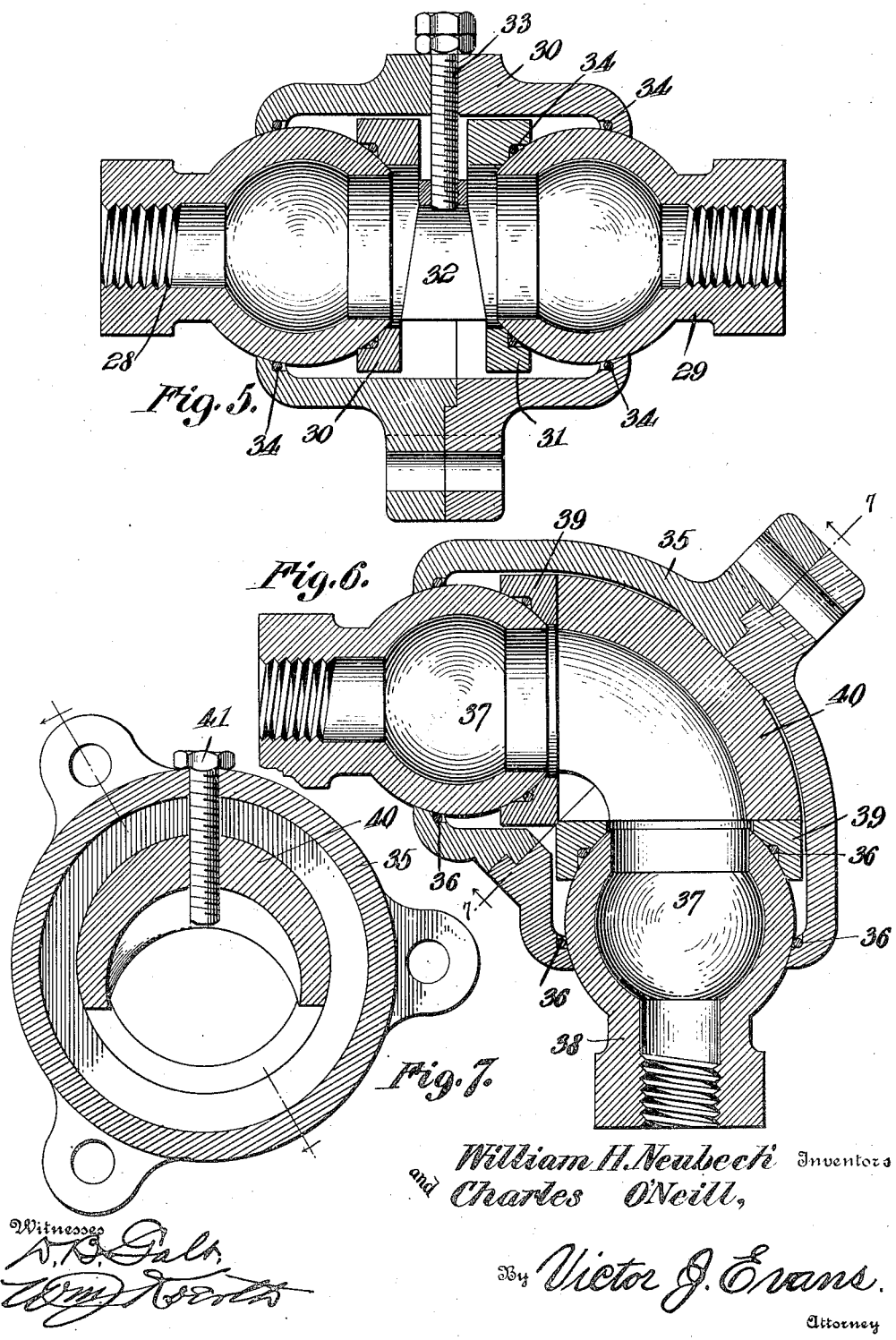

UNITED STATES PATENT OFFICE.

CHARLES O'NEILL AND WILLIAM H. NEUBECK, OF LOUISVILLE, KENTUCKY.

FLEXIBLE BALL-JOINT.

959,378.　　　　　　　　Specification of Letters Patent.　　Patented May 24, 1910.

Application filed May 19, 1909. Serial No. 497,063.

*To all whom it may concern:*

Be it known that we, CHARLES O'NEILL and WILLIAM H. NEUBECK, citizens of the United States, residing at Louisville, in the county of Jefferson and State of Kentucky, have invented new and useful Improvements in Flexible Ball-Joints, of which the following is a specification.

This invention relates to ball joints for pipe connections and the object of the invention is to provide a device of this character which is extremely simple in construction, which may be readily adjusted to lay the pipe at any desired angle and which may be manufactured at a comparatively small cost.

With the above object in view and others which will appear as the description progresses the invention resides in the novel construction and combination of elements hereinafter fully described and claimed.

Figure 1:
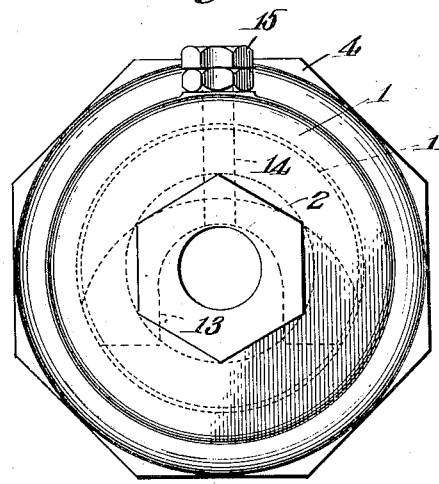
Figure 2:
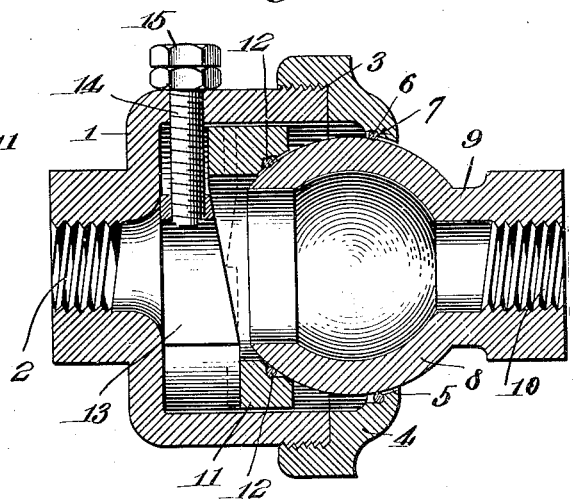
Figure 3:
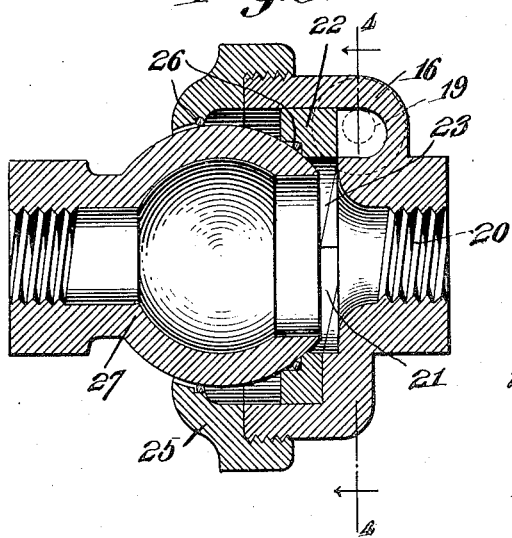
Figure 4:
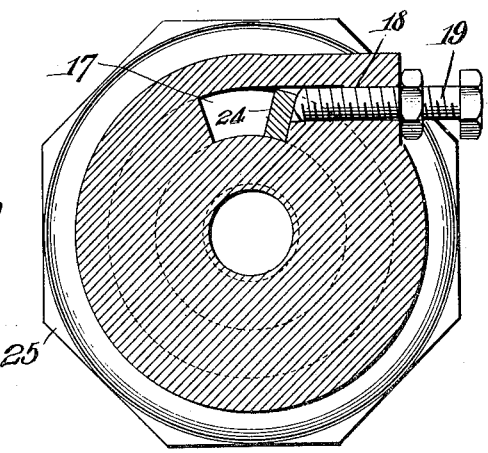

In the accompanying drawing there has been illustrated a simple and preferred embodiment of the invention and in which, Figure 1 is a front elevation of one of the forms of the device. Fig. 2 is a central longitudinal sectional view of the same. Fig. 3 is a longitudinal sectional view of a slightly modified form of the device. Fig. 4 is a vertical section upon the line 4—4 of Fig. 3. Fig. 5 is a central longitudinal sectional view of a double joint. Fig. 6 is a similar view of an angle joint. Fig. 7 is a sectional view upon the line 7—7 of Fig. 6.

In the accompanying drawing and referring particularly to Figs. 1 and 2 thereof, the numeral 1 designates what may be termed a casing. This casing 1 is provided with an enlarged body portion and a reduced threaded pipe receiving mouth 2. The casing is also provided adjacent its enlarged open body portion with external threads 3 which are adapted for the reception of internal threads formed upon a suitable collar 4. This collar 4 is provided with an open mouth 5, and the inner portion of this mouth has a circular cut away portion or depression 6 which is adapted for the reception of a suitable metallic washer 7.

The numeral 8 designates the rounded headed portion of a pipe receiving thimble 9. This thimble 9 is provided with suitable threads 10 whereby the same may be connected with a pipe, and the head 8 is adapted to fit within the casing 1 and to be contacted by the washer 7.

Positioned within the casing 1 is what I term a follower member 11. This member 11 is of a substantially ring shape and has one of its faces provided with an arcuate cut away portion or depression and positioned within this cut away portion is a suitable washer member 12. The follower member 11 as well as the washer 12 is adapted to fit snugly against the ball shaped hollow head 8 of the thimble 9.

The numeral 13 designates a wedge or arbor member. This member 13 is of an approximately semi-cylindrical construction and has one of its faces flat while its opposite face is inclined to correspond with the inclined face of the follower member. The upper portion of this substantially U-shaped wedge is provided with a suitable opening which is adapted for the reception of a threaded element 14 provided with a head 15 which extends through the top of the casing 1.

From the above description taken in connection with the accompanying drawing it will be noted that in order to provide for the angular relation of the thimble 9 with the member 1, it is merely necessary to adjust the threaded element 14 thereby forcing the wedge 13 either upwardly or downwardly in relation to the follower 11 so as to secure the thimble 9 at any desired angle.

In Figs. 3 and 4 we have illustrated a slightly modified form of the device. In these figures the casing 16 is provided with an arcuate recess or cut away portion 17 and communicating with this cut away portion is a threaded bore or opening 18 which is adapted for the reception of a threaded element 19. The casing 16 is provided with the usual threaded opening 20, and has its face adjacent the said opening provided with suitable teeth 21. In this instance the follower member 22 has its inner face also provided with teeth 23 and the said follower member has an offset projecting portion 24 extending within the cut away portion 17, and this extending portion is adapted to be contacted by the threaded element 19. The follower 22 as well as the collar 25 are each provided with suitable washer members designated by the numeral 26 and these washers are adapted to contact with the ball shaped hollow thimble member 27. In this construction it will be noted that it is simply necessary to adjust the threaded member 19 to force the teeth of the follower 22 upon the teeth of the casing in order to force the follower tightly into contact with the thimble 27 and it will be also noted that the said thimble 27 may be readily arranged at any suitable angle in relation to the casing and to be retained in said position when desired.

In Fig. 5 we have illustrated a still further modified form of the device. In this instance, we have shown a pair of pipe connecting thimbles 28 and 29 positioned within a suitable casing 30. The ball shaped hollow heads of the thimbles are each provided with suitable follower members 30 and 31 and positioned between these members is a wedge shaped element 32. The follower members 30 and 31 have their opposing faces inclined, as clearly illustrated in the said Fig. 5 of the drawing and the wedge member 32 has its opposite faces also inclined to correspond with the inclinations of the said followers. The wedge member 32 in the devices heretofore described is of a substantially U-shaped formation and the said member has its upper or connecting portion provided with a threaded aperture which is adapted for the reception of a threaded bolt member 33.

The casing employed in this device is preferably constructed of a pair of members which are provided with suitable ears whereby they may be readily connected together and the open mouths of these members as well as the arcuate faces of the followers 30 and 31 are provided with suitable depressions adapted for the reception of packing rings 34. By this construction it will be noted that it is simply necessary to adjust the wedge 32 in relation to the inclined faces of the followers to arrange the thimble members 28 and 29 at any desired inclination.

In Figs. 6 and 7, we have illustrated our improvement in connection with an angular casing 35. In this instance the casing 35 is also preferably constructed of a pair of elements provided with suitable ears adapted for the reception of bolts and having their open mouths provided with circular depressions adapted for the reception of metallic packing rings 36. These rings 36 are adapted to bear against the ball shaped hollow heads 37 of the thimble members 38. The numeral 39 designates the follower members. These members are substantially similar to those previously described, but in this instance the said members are provided with flattened faces. The numeral 40 designates the wedge member and also of a substantially U-shaped construction and has its upper portion provided with a threaded aperture which is adapted for the reception of a threaded member 41. This member 41 has its head projecting beyond the outer face of the casing so that the same may be readily rotated when it is desired to adjust the wedge member 40. By this arrangement it will be noted that the thimbles 38 may be easily and quickly arranged at any desired angle in relation to the casing 35 when desired by merely adjusting the said wedge through the medium of a threaded element 41.

Having thus fully described the invention what is claimed as new is:

1. A casing, a pipe connecting thimble having a hollow spherical head positioned within the casing, a follower member contacting the spherical head of the thimble, a wedge member engaging the follower, and means for adjusting the wedge member.

2. A casing, a pipe connecting thimble having a hollow spherical head within the casing, a follower member contacting the spherical head of the thimble, a wedge member engaging the follower and a threaded element adapted to act in conjunction with the wedge, substantially as and for the purpose set forth.

3. A casing having its mouth provided with a spherical depression, a washer member within said depression, a thimble having a hollow headed portion within the casing and having a threaded extension, a follower member engaging the spherical head of the thimble within the casing, a wedge member engaging the follower and means for adjusting the wedge member.

4. A casing provided with a cap having an open mouth and being provided with a washer, a pipe connecting thimble having a hollow spherical head, and a threaded extending portion contacting the cap thereof, a follower member engaging the hollow head of the thimble, a wedge member engaging the face of the follower, and means for adjusting the wedge member.

5. In combination with a casing having a threaded extension upon one of its faces and a cap engaging its opposite open face, said cap being provided with a spherical opening, a thimble member having a spherical headed portion within the casing and engaging the face provided by the opening of the cap, a follower member having one of its faces inclined and engaging the thimble, a wedge member engaging the inclined face of the follower member and a threaded element contacting with the wedge member, substantially as and for the purpose set forth.

6. The combination with a casing provided with a pipe engaging extension upon one of its faces and having its opposite face open, and a cap for the open face, said cap having its face provided with an annular opening, of a thimble member provided with a hollow spherical head and a threaded pipe engaging extension contacting the spherical opening of the closure, a follower member comprising a ring engaging the spherical head of the thimble, a wedge member between the follower and the inner face of the casing, and means for adjusting the wedge member in relation to the follower member.

7. The combination with a casing having an open face and a threaded pipe engaging extension, a cap for the open face of the casing, said cap being provided with a circular opening, of a thimble member provided with a hollow spherical head and a pipe extension, said thimble member having its head within the casing and engaging the hollow provided by the circular opening of the cap, a ring follower member contacting the head of the thimble, said follower having one of its faces provided with teeth, a wedge member also having one of its faces provided with teeth contacting the follower, and means for adjusting the wedge in relation to the follower member.

In testimony whereof we affix our signatures in presence of two witnesses.

CHARLES O'NEILL.
WILLIAM H. NEUBECK.

Witnesses:
MATIE BUECHLER,
PETER ACKLEY.